United States Patent [19]
Takimoto

[11] Patent Number: 5,923,493
[45] Date of Patent: *Jul. 13, 1999

[54] INFORMATION SIGNAL REPRODUCING APPARATUS HAVING MEANS FOR TRACKING CONTROL

[75] Inventor: Hiroyuki Takimoto, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/671,113

[22] Filed: Jun. 24, 1996

Related U.S. Application Data

[63] Continuation of application No. 08/250,443, May 27, 1994, abandoned.

[30] Foreign Application Priority Data

Jun. 1, 1993 [JP] Japan .................................. 5-154362

[51] Int. Cl.$^6$ .................................................. G11B 5/584
[52] U.S. Cl. .......................................... 360/77.14; 386/79
[58] Field of Search .............................. 360/77.14, 77.15, 360/10.2; 386/78, 79, 52, 61, 80, 81

[56] References Cited

U.S. PATENT DOCUMENTS

| | | | |
|---|---|---|---|
| 4,587,580 | 5/1986 | Takayama et al. | 360/77.14 |
| 4,860,130 | 8/1989 | Yokosawa et al. | 360/77.15 |
| 4,890,173 | 12/1989 | Yokozawa | 360/77.15 |
| 4,943,873 | 7/1990 | Kawasaki | 360/77.14 |
| 5,003,413 | 3/1991 | Miyazaki | 360/77.14 |
| 5,055,952 | 10/1991 | Noh | 360/77.14 |
| 5,089,919 | 2/1992 | Kozuki et al. | 360/77.14 X |
| 5,126,892 | 6/1992 | Nagasawa et al. | 360/77.15 |
| 5,146,373 | 9/1992 | Wakui et al. | 360/77.14 X |
| 5,191,431 | 3/1993 | Hasegawa et al. | 360/27 X |
| 5,258,879 | 11/1993 | Shimotashiro et al. | 360/77.15 |
| 5,402,281 | 3/1995 | Yanagihara et al. | 360/77.15 |
| 5,432,655 | 7/1995 | Nakamura et al. | 360/77.15 X |
| 5,546,248 | 8/1996 | Sakakibara et al. | 360/77.14 |
| 5,570,248 | 10/1996 | Ido et al. | 360/77.14 |

FOREIGN PATENT DOCUMENTS 62-313478  9/1989  Japan .

*Primary Examiner*—Andrew L. Sniezek
*Assistant Examiner*—James L Habermehl
*Attorney, Agent, or Firm*—Robin, Blecker & Daley

[57] ABSTRACT

An information signal reproducing apparatus for reproducing an information signal from a recording medium on which at least one kind of pilot signal component having a predetermined frequency is multiplexed with the information signal on every other track over a multiplicity of parallel tracks. The apparatus is arranged to form a tracking error signal in accordance with the pilot signal component contained in a signal reproduced during a first period by a head for reproducing a signal by periodically tracing the recording medium at a predetermined period, the first period having a length corresponding to that of the predetermined period, and execute a modifying operation for modifying the tracking error signal by using a signal reproduced by the head during a second period immediately before the first period, the second period having a length corresponding to that of the predetermined period. As another arrangement for producing an appropriate tracking control signal while executing the modifying operation, the apparatus includes a forming circuit for forming a tracking error signal in accordance with the pilot signal component contained in the signal reproduced during the predetermined period in which the head mainly reproduces a track on which the pilot signal component is multiplexed, and the forming circuit includes a sampling circuit for sampling the tracking error signal immediately after a start of the predetermined period and immediately before an end of the predetermined period.

24 Claims, 10 Drawing Sheets

HEAD TRACING BEING STABLE IN MODE 1

TAPE RUNNING BECOMING RELATIVELY SLOWER IN MODE 2

MODE 1 BEING SWITCHED TO MODE 2 WITH TRACKING SHIFTED BY TWO TRACKS

INFORMATION SIGNAL REPRODUCING APPARATUS HAVING MEANS FOR TRACKING CONTROL

This is a continuation application under 37 CFR 1.62 of prior application Ser. No. 08/250,443, filed May 27, 1994 now abandoned.

BACKGROUND OF THE INVENTION

1. Field of the Invention

The present invention relates to an apparatus for reproducing an information signal from a multiplicity of parallel tracks formed on a recording medium and, more particularly, to tracking control suitable for use in a so-called helical scan type of magnetic video recording and reproducing apparatus (hereinafter referred to as the "VTR").

2. Description of the Related Art

VTRs which are widely known as this kind of VTR include domestic-use VTRs which conform to the VHS system, the 8 mm video system or the like. Various methods for controlling head tracking during reproduction in such a VTR are proposed and practiced to faithfully trace recorded video tracks during reproduction. In the VHS system, timing pulse signals are recorded along the bottom end of a tape in correspondence with track positions (CTL system). In the 8 mm video system, a video signal onto which each of pilot signals of four different frequencies is multiplexed is recorded on each track (4f system).

In the field of domestic-use VTRs, to cope with a demand for a further improvement in image quality and a technical trend toward digitization, a VTR has recently been developed which is arranged to record an image signal for one field divisionally over a plurality of tracks so that a comparatively large amount of information can be recorded and reproduced. In addition, the following methods are proposed as tracking control systems suitable for use in digital information recording.

When a digital signal to be recorded is to be modulated, a recording signal is formed so that a frequency component corresponding to a particular pilot signal can be contained in a modulated signal, and a tracking controlling pilot signal is multiplexed with a digital information signal through the modulation of the digital signal.

More specifically, it is proposed to multiplex each of pilot signals onto each associated track, as shown in FIG. 2, in a VTR having the head arrangement shown in FIG. 1. FIG. 1 shows the positional relationships between two heads A and B, a rotary head drum 100 and a magnetic tape 101.

The operation of the shown example will be described below. In the track pattern shown in FIG. 2 which is recorded on the tape 101 by the heads A and B having different azimuth angles as shown in FIG. 1, pilot signals $f_1$ and $f_2$ of different frequencies are alternately recorded on the tracks to be recorded by the head B in the state of being multiplexed with a video information signal. As a multiplexing method, it is possible to utilize a method of selecting the frequency of the pilot signal $f_1$ or $f_2$ from a frequency band different from that of a video information signal and multiplexing either of the pilot signals $f_1$ or $f_2$ at the selected frequency, or it is also possible to utilize a method of carrying out modulation in such a manner as to control the digital sum value of a digital signal to be recorded, so that frequency spectra $f_1$ and $f_2$ can be obtained by reproduction. Incidentally, in FIG. 2, symbols "$f_0$" indicate tracks on which neither of the pilot signals $f_1$ and $f_2$ is multiplexed with the video information signal.

During reproduction, by comparing an $f_1$ component and an $f_2$ component which are contained in a signal reproduced by the head A tracing each of the tracks shown by $f_0$ in FIG. 2, it is possible to detect to what extent and to which side the position of head tracing is shifted. The resultant output can be used as a tracking error signal.

In the above-described example, however, the level of a tracking control signal which is obtained when the heads A and B are shifted by two tracks is substantially equal to the level of a tracking control signal which is obtained when the heads A and B are not shifted. Therefore, for example, if the running of the tape 101 starts to delay from the tracing of the heads A and B, the level of a tracking control signal becomes lower in spite of the occurrence of the delay in the running of the tape 101. As a result, the running of the tape 101 further delays and a shift for two tracks is cancelled, so that a normal tracking state is recovered. However, a considerably long time is required to recover the normal tracking state, and, during this time, since an off-track state is necessarily involved, no reproduced signal is obtained due to an azimuth loss, so that a visually impaired image is reproduced.

Particularly if tracking is shifted for two tracks when head tracing transfers from a non-recorded portion to a recorded portion during reproduction, a state similar to the aforesaid one occurs, and the time during which a reproduced image is disturbed until the tracking recovers a normal state becomes long. A similar phenomenon also occurs immediately after the mode of reproduction transfers from what is called "cue.review" (fast forward feeding reproduction or fast backward feeding reproduction) to normal reproduction.

SUMMARY OF THE INVENTION

An object of the present invention is to provide an information signal reproducing apparatus capable of solving the above-described problems.

Another object of the present invention is to provide an information signal reproducing apparatus capable of rapidly recovering a stable and appropriate state of tracking control even if a large tracking shift occurs.

To achieve the above objects, in accordance with one aspect of the present invention, there is provided an information signal reproducing apparatus for reproducing an information signal from a recording medium on which at least one kind of pilot signal component having a predetermined frequency is multiplexed with the information signal on every other track over a multiplicity of parallel tracks. The information signal reproducing apparatus comprises head means for reproducing a signal by periodically tracing the recording medium at a predetermined period, forming means for forming a tracking error signal in accordance with the pilot signal component contained in a signal reproduced by the head means during a first period having a length corresponding to that of the predetermined period, and modifying means for executing a modifying operation for modifying the tracking error signal by using a signal reproduced by the head means during a second period immediately before the first period, the second period having a length corresponding to that of the predetermined period.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 3:
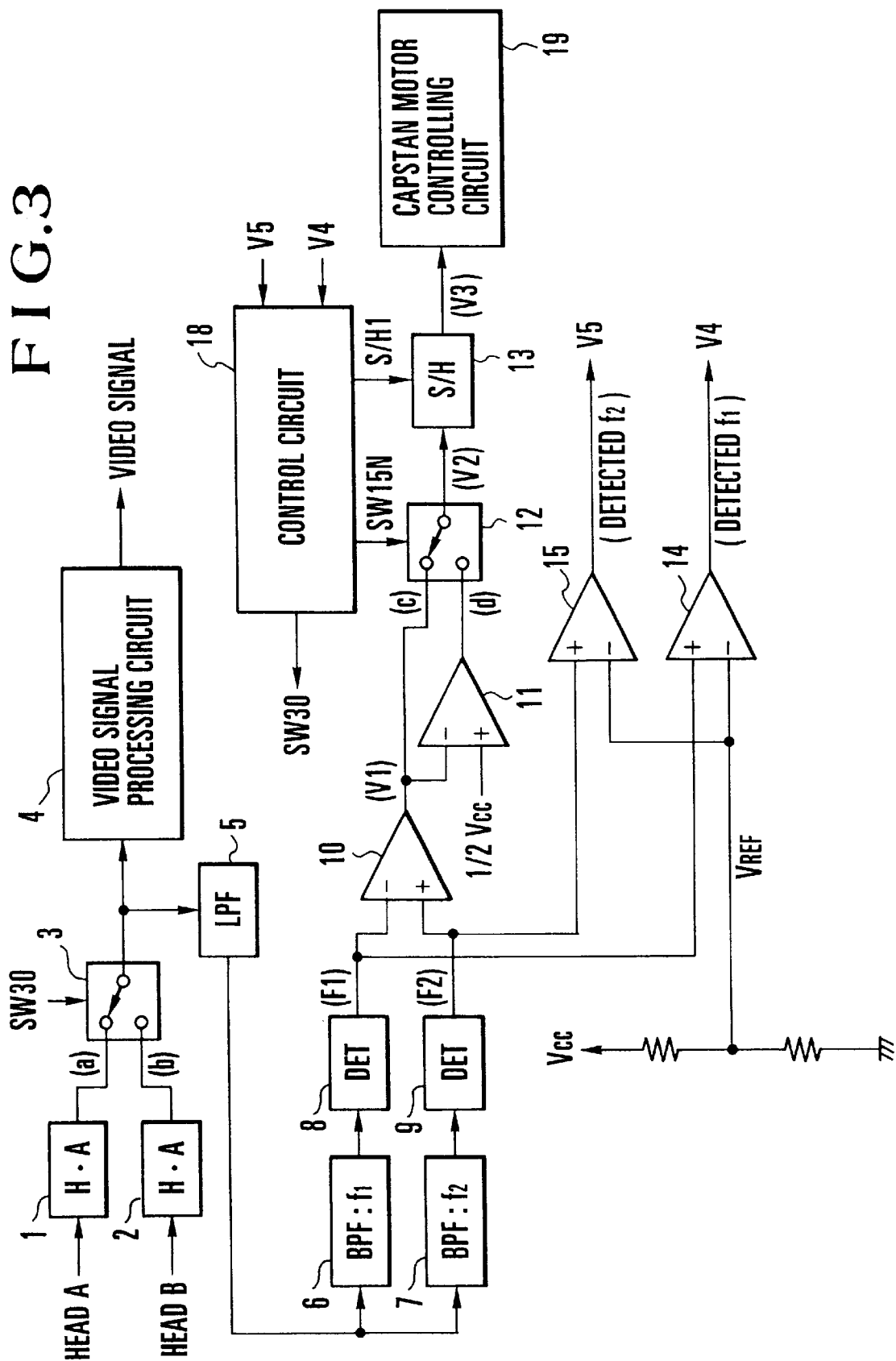
FIG. 3 is a schematic block diagram showing the arrangement of a reproducing system of a VTR according to one embodiment of the present invention.

FIG. 3 is a block diagram schematically showing the arrangement of the reproducing system of a VTR according to one embodiment of the present invention.

The arrangement shown in FIG. 3 includes head amplifiers 1 and 2 for respectively amplifying reproduced signals supplied from heads A and B, a selecting switch 3 for selecting either one of the outputs of the head amplifiers 1 and 2 in accordance with a signal SW30 which will be described later, a video signal processing circuit 4 for reproducing a predetermined video signal from the output of the selecting switch 3, a low-pass filter 5 for separating a pilot signal component from a video information signal, band-pass filters 6 and 7 for respectively extracting pilot signals $f_1$ and $f_2$, envelope detecting circuits 8 and 9 for detecting the envelopes of the outputs of the band-pass filters 6 and 7, an operational amplifier 10 for computing the difference between the outputs (F1 and F2) of the envelope detecting circuits 8 and 9, an operational amplifier 11 for inverting the output (V1) of the operational amplifier 10 on the basis of a predetermined voltage, for example, ½ Vcc, a selecting switch 12 for selecting either one of the outputs of the operational amplifier 10 and the operational amplifier 11 in accordance with a signal SW15N which will be described later, a sample-and-hold circuit 13 for sampling and holding the output (V2) of the selecting switch 12 in accordance with a sample-and-hold pulse S/H1 which will be described later.

Figure 1:
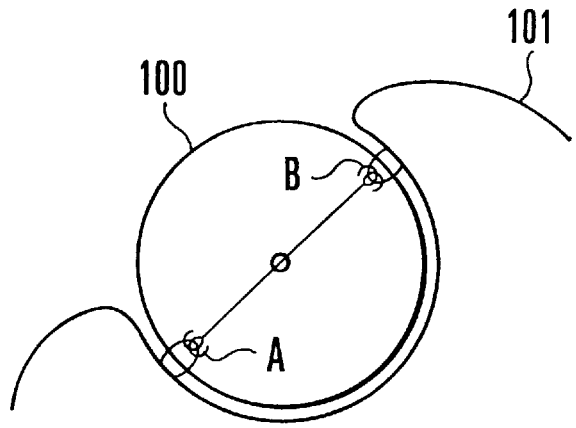
FIG. 1 is a schematic view showing the head arrangement of a VTR to which the present invention can be applied.

In the arrangement shown in FIG. 3, the signal SW30 is a reproducing-head selecting signal generated from a PG signal indicative of the rotation phase of the drum 100 shown in FIG. 1. The selecting switch 3 is alternately switched between terminals "a" and "b" according to which of the heads A or B is tracing a tape 101, in accordance with the signal SW30, whereby a continuous reproduced signal is obtained. The continuous reproduced signal is applied to the video signal processing circuit 4. When the head A reproduces the track (A) shown in FIG. 2, the reproduced signal is also supplied to the band-pass filters 6 and 7 via the low-pass filter 5, and pilot signals $f_1$ and $f_2$, which are crosstalk obtained from both adjacent tracks (B), are respectively extracted by the band-pass filters 6 and 7. The pilot signals $f_1$ and $f_2$ are respectively envelope-detected by the envelope detecting circuits 8 and 9. The envelope detecting circuits 8 and 9 respectively output detected envelope levels (F1) and (F2) to the operational amplifier 10. The operational amplifier 10 computes the difference between the detected envelope levels (F1) and (F2) and provides an output (V1). Since the pilot signals $f_1$ and $f_2$ are reciprocally obtained from alternate tracks in the direction of tape running, the output (V1) is also supplied to and inverted by the operational amplifier 11 on the basis of a predetermined level (for example, ½ Vcc), whereby the operational amplifier 11 provides an output (−V1).

As will be described later, normally, the selecting switch 12 is alternately switched between terminals "c" and "d" in accordance with the signal SW15N obtained by frequency-dividing the signal SW30, whereby the outputs (V1) and (−V1) are alternately selected. The thus-obtained signal (V2) is sampled and held by the sample-and-hold circuit 13 in accordance with the sample-and-hold pulse S/H1, whereby a tracking control signal (V3) is obtained.

The arrangement shown in FIG. 3 further includes comparators 14 and 15 for respectively comparing the outputs (F1) and (F2) of the respective envelope detecting circuits 8 and 9 with a predetermined threshold voltage $V_{REF}$.

Figure 4:
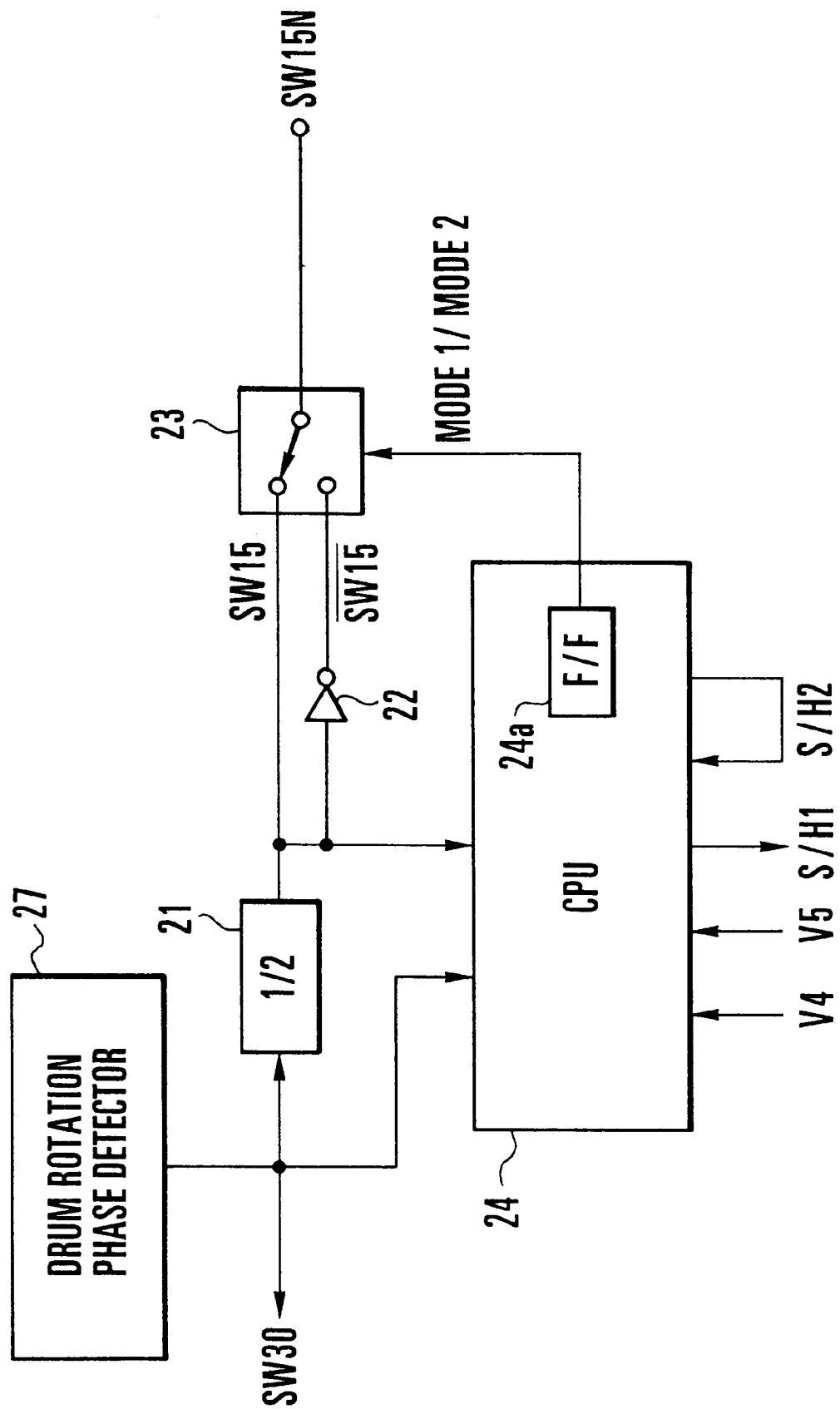
FIG. 4 is a schematic block diagram showing a specific arrangement of the control circuit shown in FIG. 3.

FIG. 4 is a block diagram showing a control circuit 18 which includes a timing signal generating circuit for generating the three signals SW30, SW15N and S/H1 shown in FIG. 3.

As shown in FIG. 4, the control circuit 18 includes a frequency divide-by-two circuit 21, a logical inverting circuit (hereinafter referred to as the "NOT circuit") 22, a selecting switch 23, a microcomputer (hereinafter referred to as the "CPU") 24 and a flip-flop 24a. In the control circuit 18, the head selecting signal SW30 which is based on the drum rotation phase detector (PG) 27 is frequency-divided by the frequency divide-by-two circuit 21, thereby forming the signal SW15 having a frequency equal to ½ the frequency of the head selecting signal SW30. The signal SW15 is inverted by the NOT circuit 22, thereby forming an inverted signal $\overline{SW15}$.

The selecting switch 23 selects either one of the signal SW15 and the inverted signal $\overline{SW15}$ and outputs the selected signal as the signal SW15N. The selecting switch 23 is switched by a "mode 1/mode 2" signal which is a control signal supplied from the flip-flop 24a. The signal S/H1 is a sample-and-hold pulse which controls the sample-and-hold circuit 13 for holding the tracking control signal (V3) during the period in which the signal SW30 is at its low level, i.e., no tracking control signal (V3) is obtained. In terms of control characteristics, it is preferable to sample and hold the tracking control signal (V3) in the vicinity of the leading and trailing ends of the period in which the signal SW30 is at its high level, i.e., the tracking control signal (V3) is obtained.

Incidentally, a signal S/H2 is a pulse which has a predetermined phase and period with respect to the signal SW15 within the CPU 24. The signal S/H2 is shown for the convenience of description of the flip-flop 24a provided in the CPU 24 which outputs the "mode 1/mode 2" signal.

Figure 5:
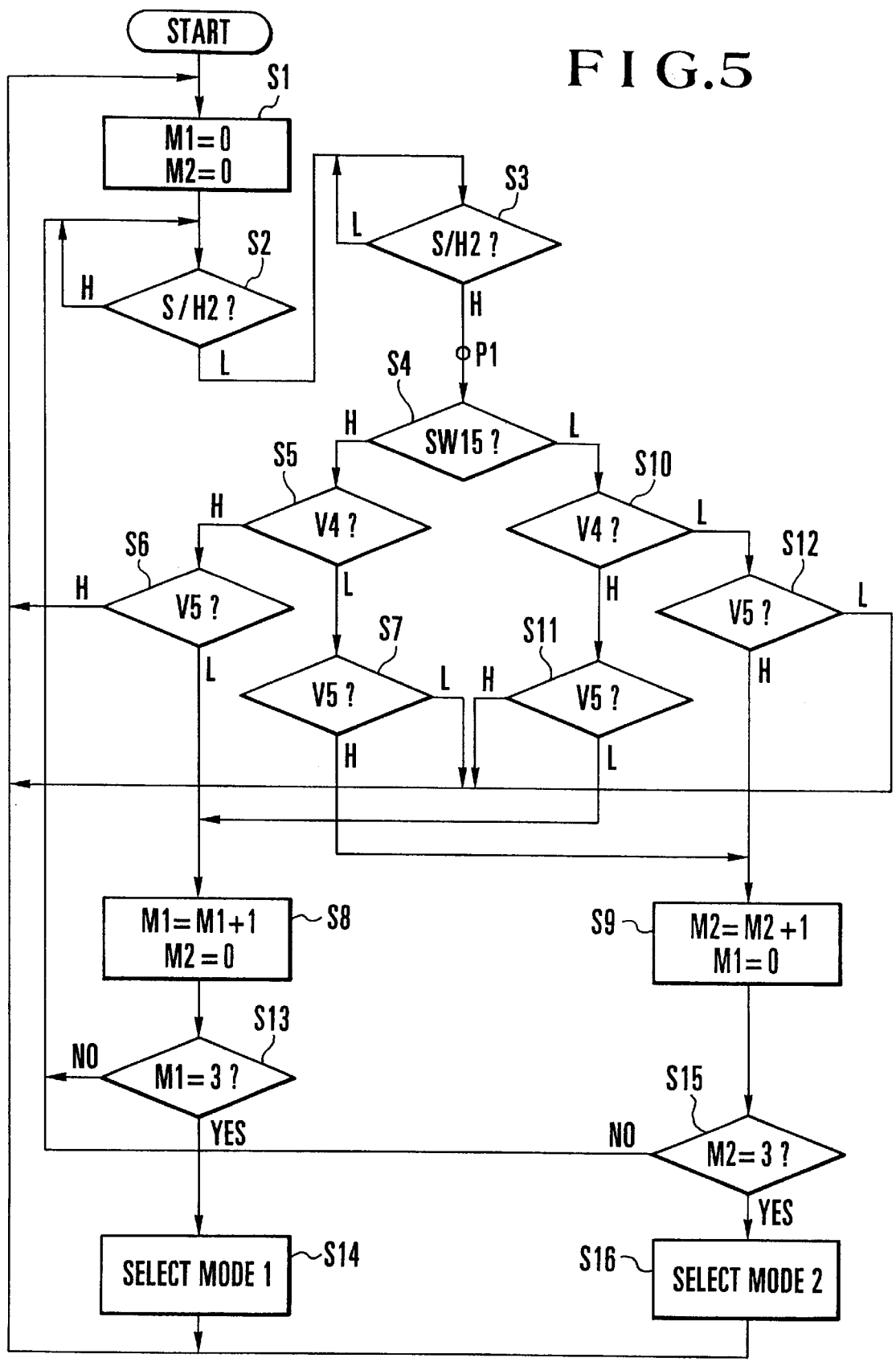
FIG. 5 is a flowchart aiding in describing the operation of the microcomputer (CPU) shown in FIG. 4.

FIG. 5 shows a flowchart which aids in describing the operation of the CPU 24.

Figure 6:
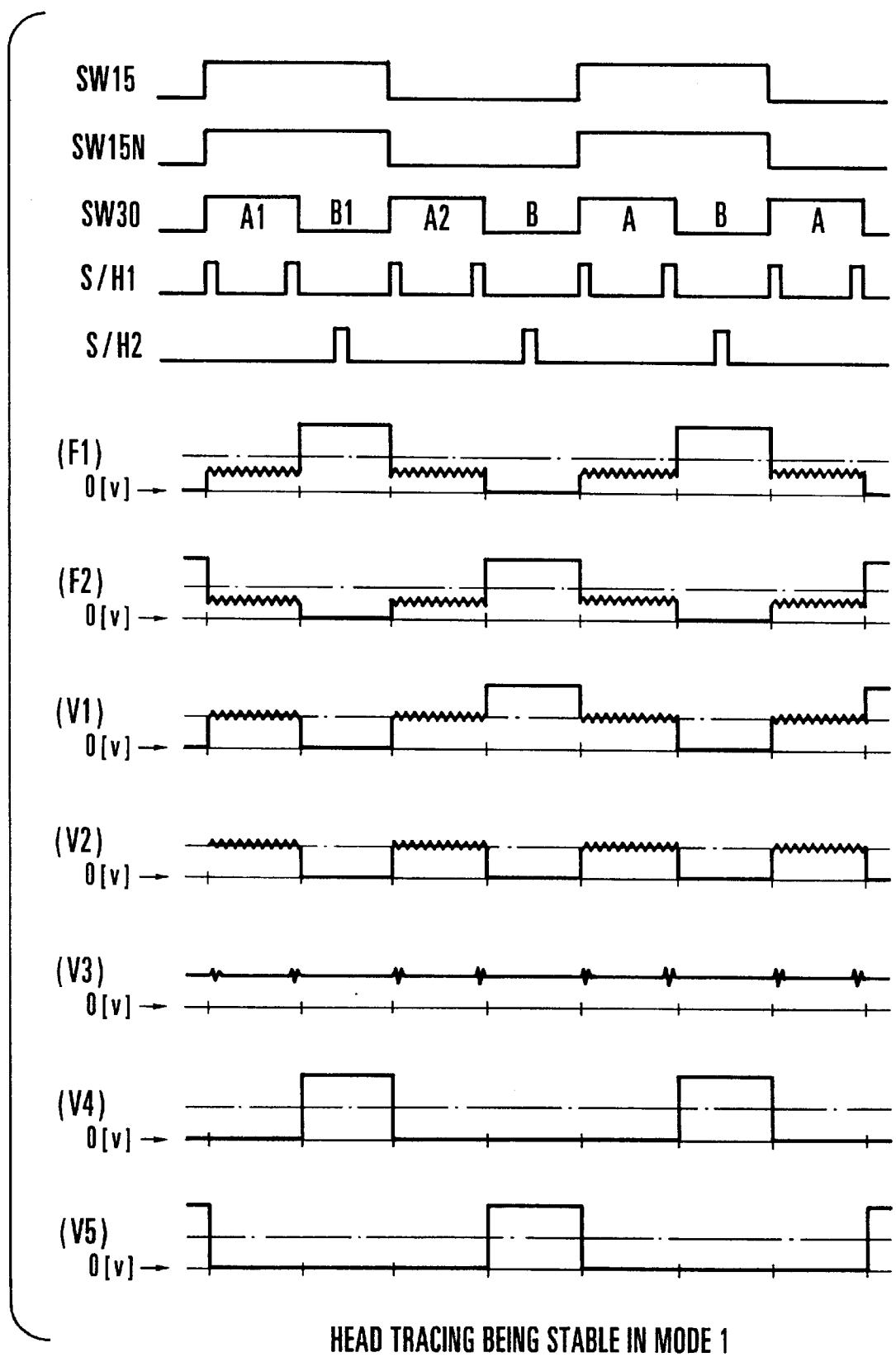
FIGS. 6, 7 and 8 are timing charts showing the operations of relevant portions of the arrangement shown in FIG. 3.
Figure 7:
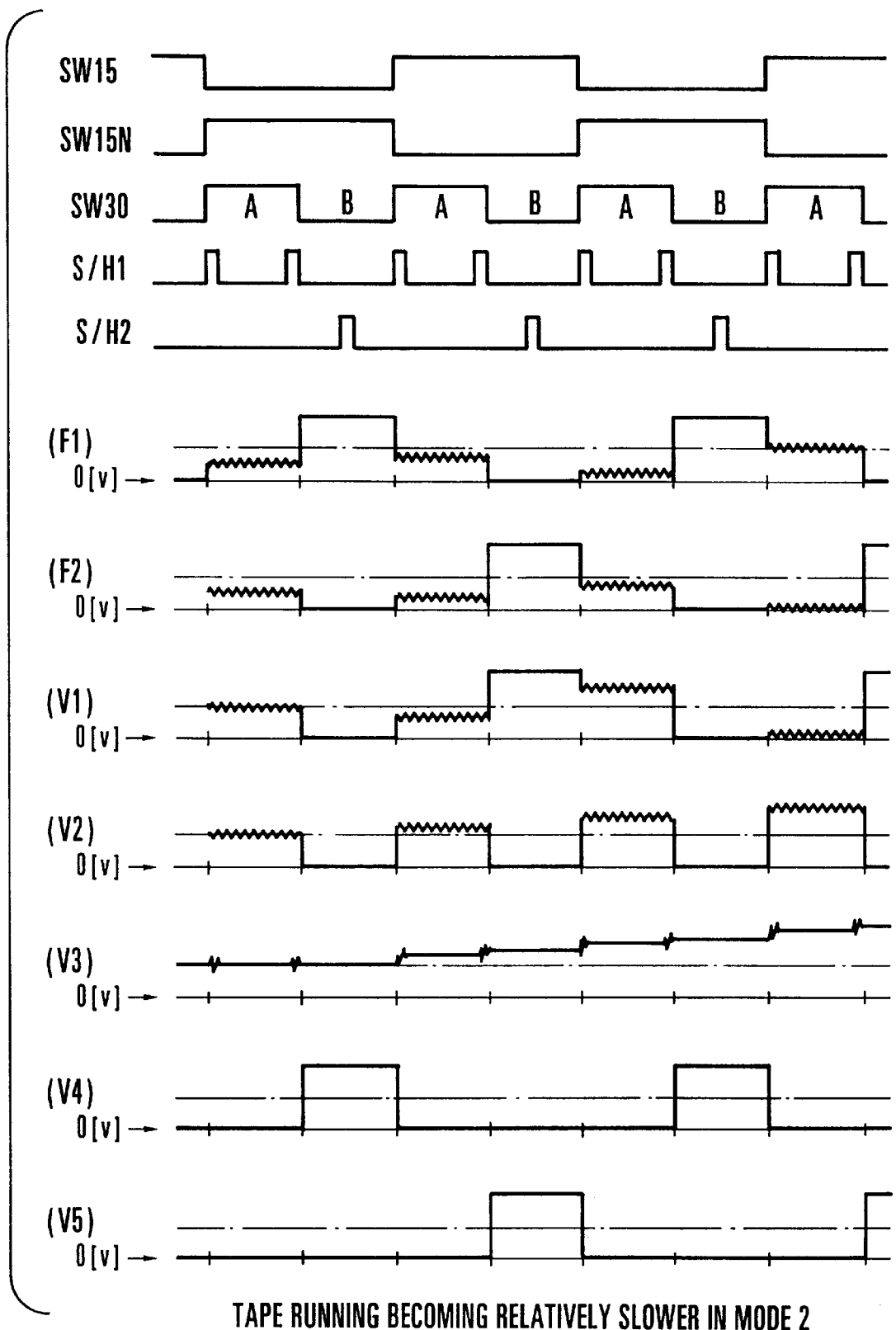
Figure 8:
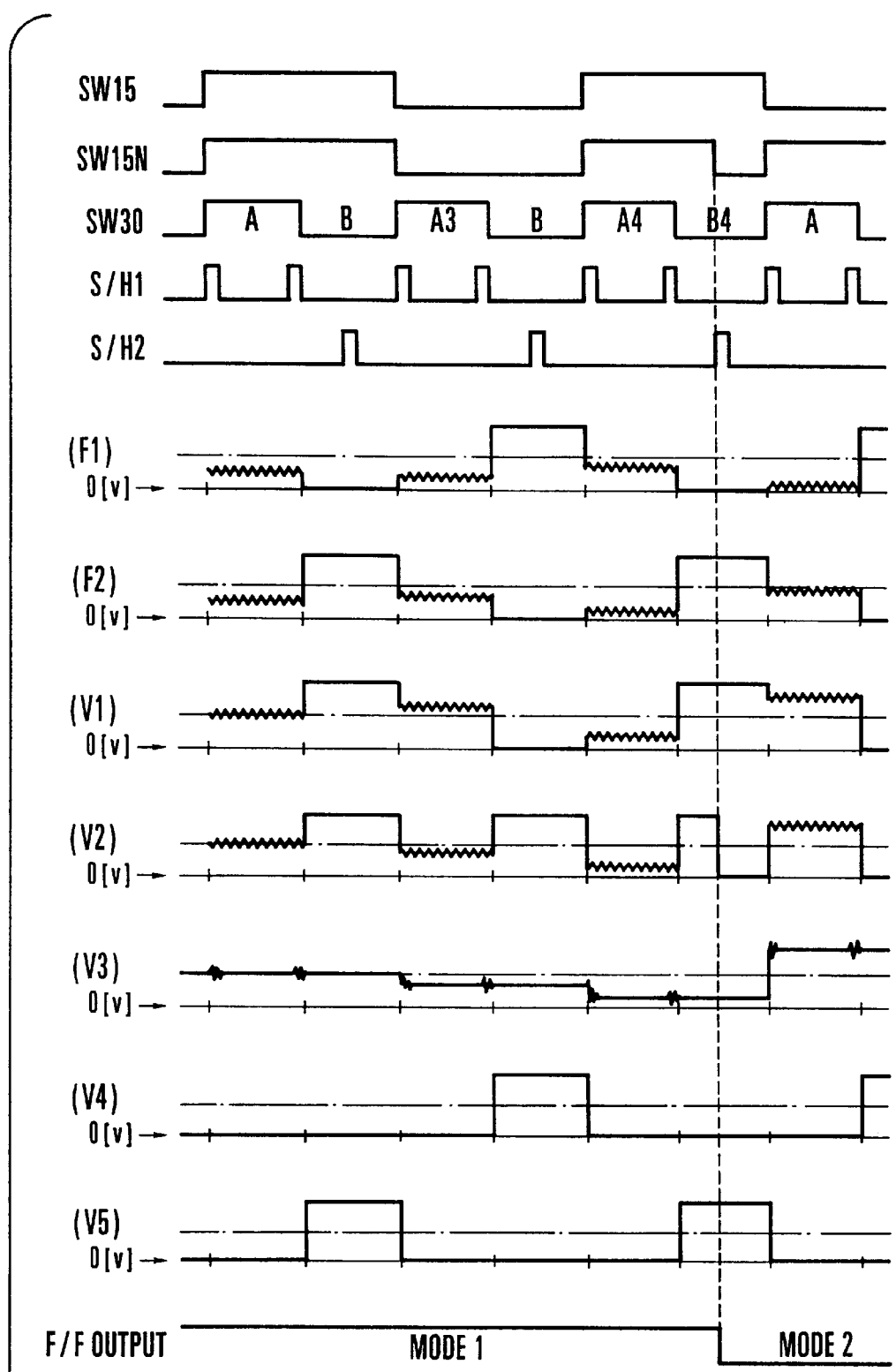

FIGS. 6, 7 and 8 show different timing charts.

FIG. 6 shows signal waveforms which respectively appear at relevant portions in the arrangement shown in FIGS. 3 and 4 when the selecting switch 23 is connected to a side coupled to the signal SW15 (hereinafter referred to as the "mode 1") with the heads A and B being stably tracing tracks approximately along the respective center lines thereof.

FIG. 7 shows a transient state in which head tracing becomes gradually faster approximately from the center of a track, i.e., tape running becomes relatively slower, when the selecting switch 23 is connected to a side coupled to the inverted signal $\overline{SW15}$ (hereinafter referred to as the "mode 2").

FIG. 8 shows a transient state in which a tracking shift for two tracks occurs by some cause during the mode 1 and the CPU 24 detects the two-track shift three times (i.e., three cycles of the signal SW30) so that the mode 1 is switched to the mode 2.

Figure 2:
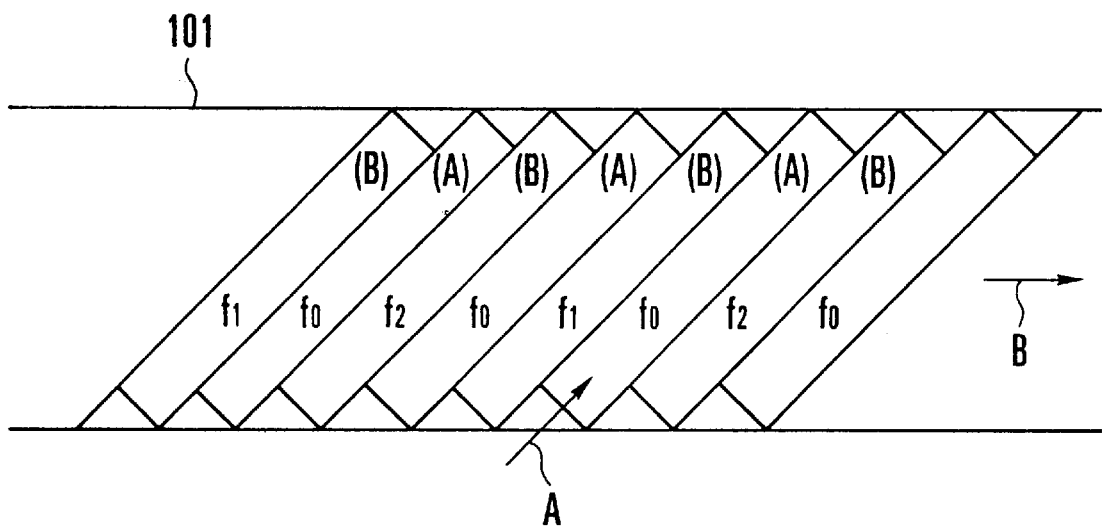
FIG. 2 is a schematic view showing a recording pattern recorded on a tape by the VTR having the head arrangement shown in FIG. 1.

As shown in FIG. 2, the pilot signals $f_1$ and $f_2$ are alternately multiplexed with the digital signals contained in the respective tracks (B) recorded by the head B. Another pilot signal $f_0$ is recorded in each of the tracks (A) recorded by the head A, or no pilot signal is recorded therein.

The operation of the present embodiment will be described below. It is assumed that the head A traces a particular track of the tracks (A) of FIG. 2 approximately along the center line thereof (as shown by an arrow A in FIG. 2). The level of the crosstalk $f_1$ derived from the state in which the tape 101 advances from the tracing of the head A (the state in which the tape 101 advances in the direction shown by an arrow B in FIG. 2) is approximately the same as the level of the crosstalk $f_2$ derived from the state in which the tape 101 delays from the tracing of the head A. Referring to the timing chart shown in FIG. 6, the tracking voltage (V3), which finally serves as a tracking control signal, is obtained from the difference voltage between the signals (F1) and (F2) reproduced during the period in which the signal SW30 is at a level A1 (i.e., at the high level). In many cases, in view of design, the tracking voltage (V3) is selected to be approximately close to the center of a power source voltage.

After the head A traces the track (A), the head B traces the adjacent track (B), so that the pilot signal $f_1$ is reproduced from the track (B) and the signals $f_o$ are obtained as crosstalk from both adjacent tracks (A). Accordingly, during the period of the signal SW30 which is shown at B1 in FIG. 6, the respective waveforms at the relevant portions are as follows: the signal (F1) is at its maximum level, the signal (F2) is at its zero level, the signal (V4) is at its high level, and the signal (V5) is at its low level. However, during the period shown at B1, the signal (V3) is held at the level which it has taken immediately before the end of the period A1.

During the period shown at A1, the signal $f_1$ represents crosstalk derived from the state in which the tape 101 advances from the tracing of the head A and the signal $f_2$ represents the crosstalk derived from the state in which the tape 101 delays from the tracing of the head A. Accordingly, if the tape running delays for some reason, the crosstalk $f_1$ descreases, while the crosstalk $f_2$ increases. Accordingly, the signal (V1) (=F2–F1) increases, the signal SW15N is at its high level, the selecting switch 12 of FIG. 3 is connected to the terminal (c), the signal (V2) to be sampled increases, the output signal (V3) of the sample-and-hold circuit 13 increases and the level of the tracking control signal (V3) becomes higher. Thus, the voltage applied to a capstan motor (not shown) is made higher. In this manner, a capstan motor controlling circuit 19 operates so that the delay of the tape running can be cancelled.

Then, during the period shown at A2, the signal $f_1$ is obtained as the crosstalk derived from the state in which the tape 101 delays from the tracing of the head A, while the signal $f_2$ is obtained as the crosstalk derived from the state in which the tape 101 advances from the tracing of the head A. Accordingly, the selecting switch 12 is connected to the terminal (d) in accordance with the signal SW15N, and as the tape running delays, the voltage applied to the capstan motor is similarly made higher.

The timing chart of FIG. 7 shows an operation substantially similar to that described above with reference to the timing chart of FIG. 6, but, in FIG. 7, the mode 2 is selected and the selecting switch 23 selects the inverted signal $\overline{SW15}$ so that the signals SW15 and SW15N are placed in logically inverse relation to each other. FIG. 7 shows signal waveforms which respectively appear at the relevant portions when the aforesaid delay occurs in the tape running. In this case as well, the level of the signal (V3) becomes higher.

FIG. 8 shows the state in which while the mode 1 is selected, the position of the head tracing is shifted for some reason by two tracks from a desired track to be traced and, in addition, a delay occurs in the tape running.

In this state, although the delay occurs in the tape running, the tracking control signal (V3) continues to become lower. The CPU 24 determines whether each of the signals (V4) and (V5) is at the high (H) or low (L) level, in accordance with the timing of the signal S/H2, i.e., the CPU 24 selects either one of the modes 1 and 2 on the basis of a pilot signal reproduced one track before the tracking control signal (V3) is obtained.

In the present embodiment, as shown in FIG. 8 by way of example, if three pulses S/H2 are continuously counted, one of the modes 1 and 2 is switched to another.

In FIG. 8, when the mode 1 is switched to the mode 2 in accordance with the timing of the pulse S/H2 during the period shown at B4, tracking error voltage becomes higher and the capstan motor is accelerated so that the two-track shift is cancelled without involving an off-track state and a stable tracking state is reached.

Referring to the flowchart shown in FIG. 5, if the rise of the pulse S/H2 is detected in Step S3 (at a point P1), the process proceeds to Step S4, in which it is determined whether the signal SW15 is at the high or low level. If the signal SW15 is at the high level (if the signal V4 is at the low level and the signal V5 is at the high level), it is determined that a shift for two tracks has occurred. If the signal SW15 is at the low level (if the signal V4 is at the high level and the signal V5 is at the low level), it is determined that a shift for two tracks has occurred. If the aforesaid decision is repeated three times during the period in which three pulses S/H2 are continuously counted, i.e., if a variable M1 is set to "3" or a variable M2 is set to "3", mode switching is performed.

More specifically, in FIG. 5, the values of the variables (or counters) M1 and M2 are reset in Step S1, and if the pulse S/H2 goes to the high level in Step S3 after the pulse S/H2 goes to the low level in Step S2 or S3, it is determined in Step S4 whether the signal SW15 is at the high or low level. If the signal SW15 is at the high level, the level of the signals V4 and V5 are checked in Steps S5, S6 and S7. If the signal V4 is at the high level and the signal V5 is at the low level, the process proceeds to Step S8. If the signal V4 is at the low level and the signal V5 is at the high level, the process proceeds to Step S9. Otherwise, the process returns to Step S1.

If it is determined in Step S4 that the signal SW15 is at the low level, the levels of the signals V4 and V5 are checked in Steps S10, S11 and S12. If the signal V4 is at the high level and the signal V5 is at the low level, the process proceeds to Step S8. If the signal V4 is at the low level and the signal V5 is at the high level, the process proceeds to Step S9. Otherwise, the process proceeds to Step S1.

After the counter M1 is incremented by one in Step S8, the above-described operation which starts in Step S2 is repeated until the variable M1 reaches "3" in Step S13. If the variable M1 reaches "3", the mode 1 is selected in Step S14, and the process returns to Step S1.

After the counter M2 is incremented by one in Step S9, the above-described operation which starts in Step S2 is repeated until the variable M2 reaches "3" in Step S15. If the variable M2 reaches "3", the mode 2 is selected in Step S16, and the process returns to Step S1.

Figure 9:
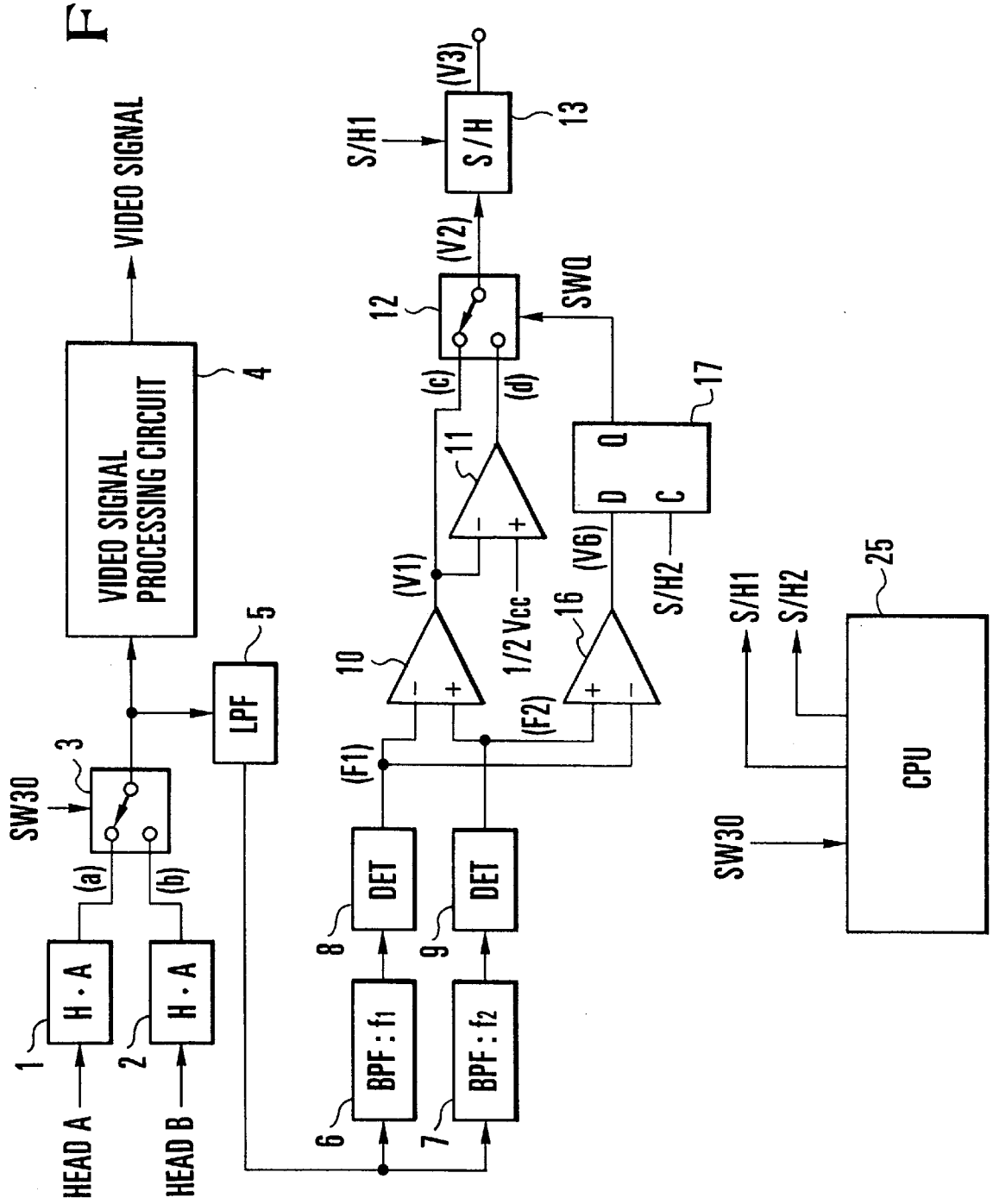
FIG. 9 is a schematic view showing the arrangement of a reproducing system of a VTR according to another embodiment of the present invention.

FIG. 9 is a circuit block diagram showing a second embodiment of the present invention. In FIG. 9, identical reference numerals are used to denote constituent elements identical to those shown in FIG. 3.

The circuit shown in FIG. 9 further includes a comparator 16 for comparing the level of the signal (F1) and the level of the signal (F2), a D-type flip-flop (DFF) 17 which receives the output signal (V6) of the comparator 16 at its D input and the pulse S/H2 at its clock input and which provides a Q output SWQ for controlling the selecting switch 12, and a CPU 25 which differs in function from the CPU 24 of FIG. 4. The CPU 25 generates from the signal SW30 the pulses S/H1 and S/H2 show n in the timing chart of FIG. 11.

In FIG. 9, when the pulse S/H2 changes from the low level to the high level, if the signal (F2)>the signal (F1), the signal SWQ is latched at its high level, whereas if the signal (F2)<the signal (F1), the output signal SWQ of the DFF 17 goes to its low level. If the signal SWQ is at the high level, the selecting switch 12 is connected to the terminal (c), whereas if the signal SWQ is at the low level, the selecting switch 12 is connected to the terminal (d).

Figure 10:
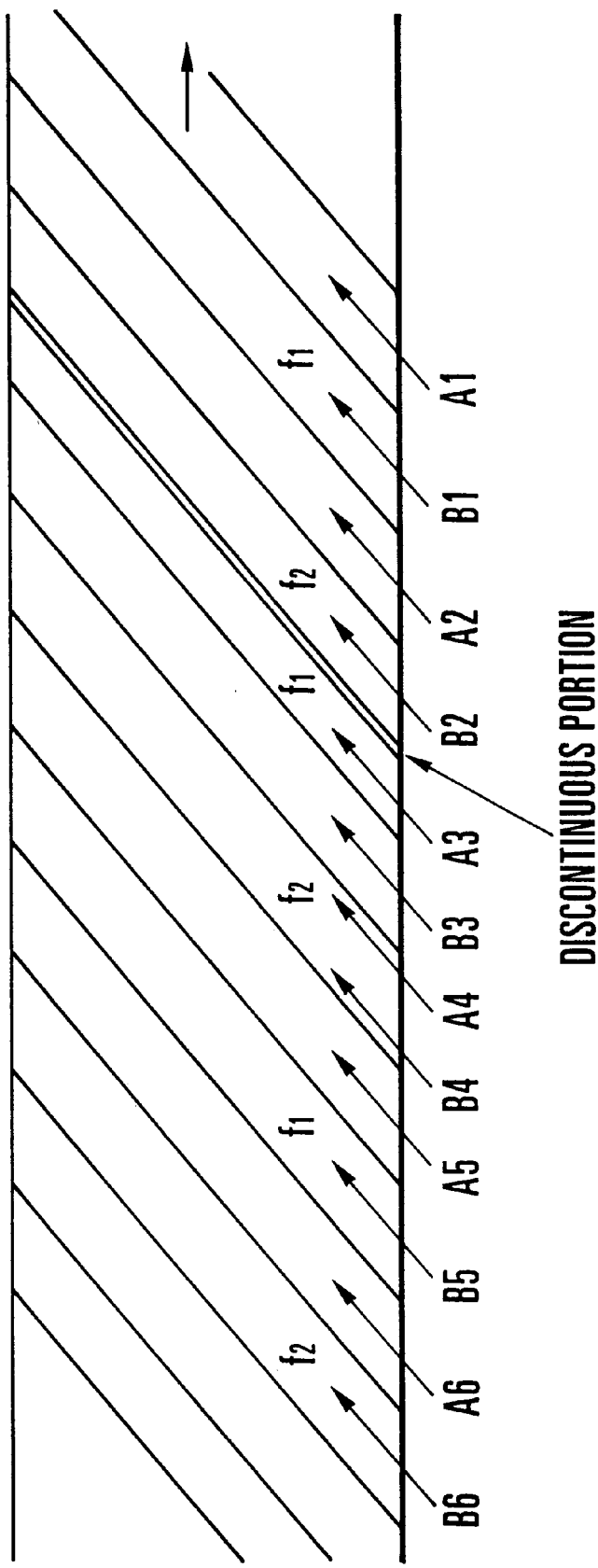
FIG. 10 is a schematic view showing a recording pattern on a tape in which tracks are discontinuously formed.
Figure 11:
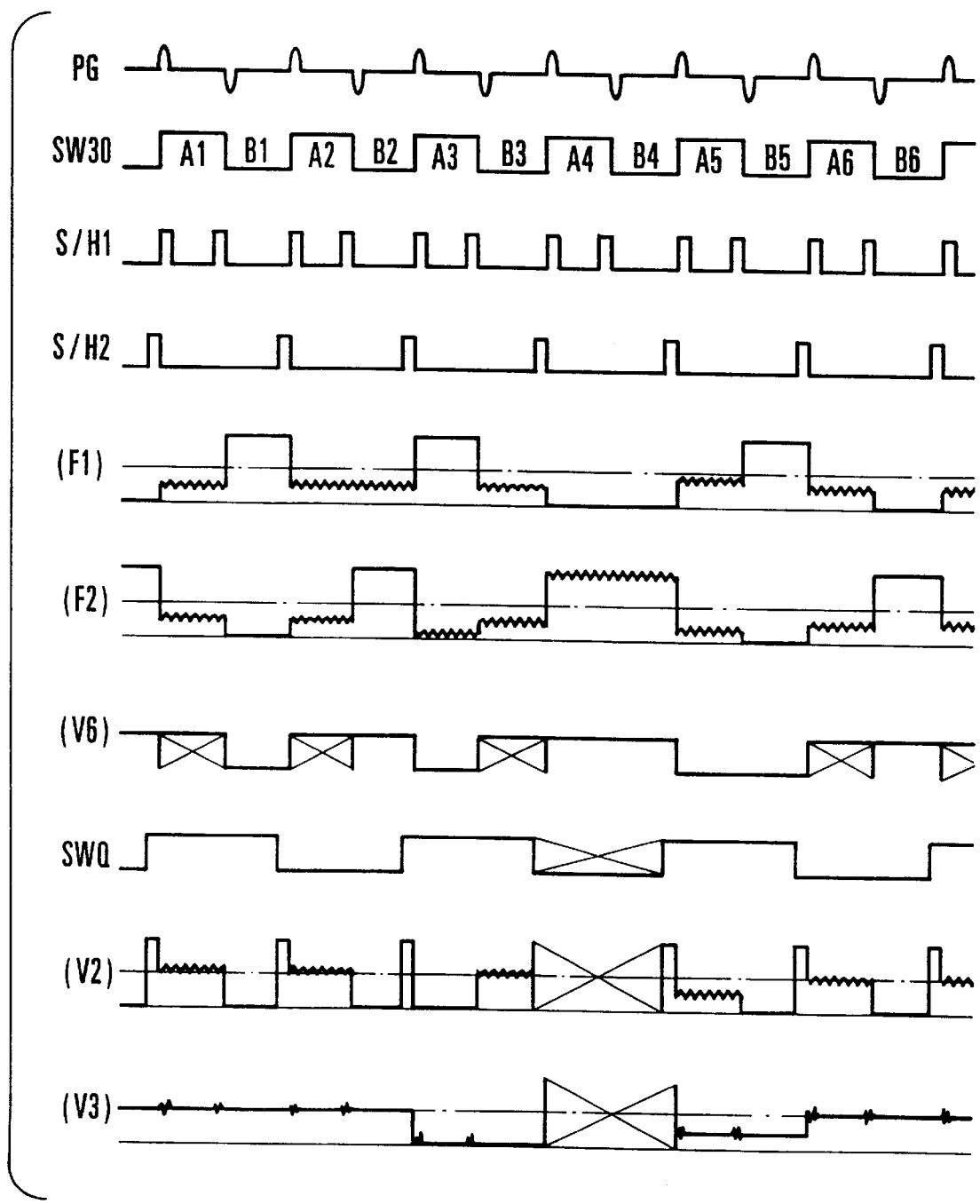
FIG. 11 is a timing chart showing the operations of relevant portions of the arrangement shown in FIG. 9.

FIG. 10 shows a track pattern in which tracks are discontinuously recorded. FIG. 11 shows waveforms which respectively appear at the relevant portions when the tracks of FIG. 10 are continuously reproduced by means of the embodiment shown in FIG. 9.

The operation of the second embodiment will be described below. When the heads A and B pass through a discontinuous portion after their stable tracking states (which correspond to traces A1, B1 and A2), the tracking control signal (V3) is disturbed from the period of a trace A3. However, after that, once the head B can reproduce the signal $f_1$ or $f_2$ at a relatively high level (the period shown at B4), it is possible to recover a stable tracking state without carrying out a head shift for two tracks.

In other words, the output of the comparator 16 is sampled and held in accordance with the pulse S/H2 immediately before the completion of each tracing of the head B. Accordingly, it can be determined whether the selecting switch 12 needs to be connected to the terminal (c) or (d) during the tracing period of the head A subsequent to each tracing period of the head B in order to recover a stable and appropriate tracking state as fast as possible.

In accordance with each of the above-described embodiments, although an analog filter is employed to detect a pilot signal, it is also possible to adopt an arrangement for digitally detecting a predetermined frequency component from a digital modulated signal.

As is apparent from the foregoing description, in accordance with each of the above-described embodiments, a pilot signal is obtained by tracing one track before the tracing of each track on a tape, and it is determined from the pilot signal whether the crosstalk between a track which is next traced and both adjacent tracks is derived from the state in which tape running advances from head tracing or the state in which tape running delays from head tracing, so that tracking is controlled in the direction in which tracking is made to advance or delay. Accordingly, it is possible to rapidly recover a stable tracking state even if the position of head tracing is shifted by two tracks from a desired track to be traced.

What is claimed is:

1. An information signal reproducing apparatus for reproducing an information signal from a recording medium on which a multiplicity of parallel tracks are formed, a first pilot signal component being repeatedly superimposed on the information signal recorded on first tracks each of which is located at one of adjacent four tracks, a second pilot signal, which has a different frequency component from the first pilot signal component, being repeatedly superimposed on the information signal recorded on second tracks each of which is located at another one of adjacent four tracks, no pilot signal component being superimposed on the information signal recorded on every other track located between the first tracks and the second tracks, comprising:

(a) head means for reproducing a signal by periodically tracing the recording medium at a predetermined period;

(b) forming means for forming a tracking error signal by comparing the first and second pilot signal components concurrently contained in a signal reproduced by said head means in a first period having a length corresponding to that of the predetermined period; and (c) modifying means for executing a modifying operation for modifying the tracking error signal in accordance with at least one of the first and second pilot signal components contained in a signal reproduced by said head means in a second period immediately before the first period, the second period having a length corresponding to that of the predetermined period.

2. An apparatus according to claim 1, wherein the reproduced signal which is used by said modifying means to modify the tracking error signal formed by said forming means in accordance with the pilot signal components contained in a signal reproduced by tracing a first track in the first period is a signal reproduced by tracing a second track adjacent to the first track in the second period.

3. An apparatus according to claim 1, wherein said head means includes first and second heads for alternately tracing the recording medium and said modifying means uses a signal reproduced by the second head to modify a tracking error signal formed by said forming means in accordance with the first and second pilot signal components contained in a signal reproduced by the first head.

4. An apparatus according to claim 1, wherein said modifying means includes means for inverting a polarity of the tracking error signal.

5. An apparatus according to claim 1, wherein said modifying means includes a modifying circuit for modifying the tracking error signal to shift a track to be traced by said head means in response to the tracking error signal, by a predetermined number of tracks.

6. An apparatus according to claim 1, wherein said forming means includes extracting means for concurrently extracting the first and second pilot signal components to be compared with each other.

7. An apparatus according to claim 1, wherein said modifying means includes detecting means for detecting whether the pilot signal component contained in the signal reproduced by said head means is a pilot signal component recorded on a track shifted by a predetermined number of tracks from a track which is to be traced by said head means controlled by the tracking error signal.

8. An apparatus according to claim 1, wherein said modifying means executes said modifying operation when said detecting means detects that the pilot signal component contained in the signal reproduced by said head means is the pilot signal component recorded on the track shifted by the predetermined number of tracks continuously by a plurality of times.

9. An information signal reproducing apparatus for reproducing an information signal from a recording medium on which a multiplicity of parallel tracks are formed, a first pilot signal component being repeatedly superimposed on the information signal recorded on first tracks each of which is located at one of adjacent four tracks, a second pilot signal, which has a different frequency component from the first pilot signal component, being repeatedly superimposed on the information signal recorded on second tracks each of which is located at another one of adjacent four tracks, no pilot signal component being superimposed on the information signal recorded on every other track located between the first tracks and the second tracks, comprising:

(a) a reproducing head for reproducing a signal by periodically tracing the recording medium at a predetermined period;

(b) a tracking control circuit for executing tracking control by comparing the first and second pilot signal components concurrently contained in a signal reproduced by said reproducing head in a first period having a length corresponding to that of the predetermined period; and (c) an adjusting circuit for adjusting said tracking control circuit by using at least one of the first and second pilot signal components contained in a signal reproduced by said reproducing head in a second period immediately before the first period, the second period having a length corresponding to that of the predetermined period.

10. A information signal reproducing apparatus for reproducing an information signal from a recording medium on which a multiplicity of parallel tracks are formed, a first pilot signal component being repeatedly superimposed on the information signal recorded on first tracks each of which is located at one of adjacent four tracks, a second pilot signal, which has a different frequency component from the first pilot signal component, being repeatedly superimposed on the information signal recorded on second tracks each of which is located at another one of adjacent four tracks, no pilot signal component being superimposed on the information signal recorded on every other track located between the first tracks and the second tracks, comprising:

(a) head means for reproducing a signal by tracing the recording medium, said head means including first and second heads for alternately tracing the recording medium;

(b) forming means for forming a tracking error signal by comparing the first and second pilot signal components concurrently contained in a signal reproduced by said first head; and (c) modifying means for executing a modifying operation for modifying the tracking error signal by using at least one of the first and second pilot signal components contained in a signal reproduced by said second head prior to the signal reproduction by said first head.

11. An apparatus according to claim 10, wherein the reproduced signal which is used by said modifying means to modify the tracking error signal formed by said forming means in accordance with the first and second pilot signal components contained in a signal reproduced by tracing a first track by said first head is a signal reproduced by tracing a second track adjacent to the first track by said second head.

12. An apparatus according to claim 10, wherein said first and second heads alternately trace the recording medium at intervals of a predetermined period, the reproduced signal which is used by said modifying means to modify the tracking error signal formed by said forming means in accordance with the first and second pilot signal components contained in a signal reproduced by said first head in a first period having a length corresponding to that of the predetermined period is a signal reproduced by said second head in a second period immediately before the first period, the second period having a length corresponding to that of the predetermined period.

13. An apparatus according to claim 10, wherein said modifying means includes means for inverting a polarity of the tracking error signal.

14. An apparatus according to claim 10, wherein said modifying means includes a modifying circuit for modifying the tracking error signal to shift said head means to a track to be traced by said head means in accordance with the tracking error signal by a predetermined number of tracks.

15. An apparatus according to claim 10, wherein said forming means includes extracting means for concurrently extracting the first and second pilot signal components to be compared with each other.

16. An information signal reproducing apparatus for reproducing an information signal from a recording medium on which a multiplicity of parallel tracks are formed, a first pilot signal component being repeatedly superimposed on the information signal recorded on first tracks each of which is located at one of adjacent four tracks, a second pilot signal, which as a different frequency component from the first pilot signal component, being repeatedly superimposed on the information signal recorded on second tracks each of which is located at another one of adjacent four tracks, no pilot signal component being superimposed on the information signal recorded on every other track located between the first tracks and the second tracks, comprising:

(a) first and second heads for alternately tracing the recording medium;

(b) a tracking control circuit for executing tracking control of said first and second heads by comparing the first and second pilot signal components concurrently contained in a signal reproduced by said first head; and (c) an adjusting circuit for adjusting said tracking control circuit by using at least one of the first and second pilot signal components contained in a signal reproduced by said second head prior to the signal reproduction by said first head.

17. An information signal reproducing apparatus for reproducing an information signal from a recording medium on which a multiplicity of parallel tracks are formed, a first pilot signal component being repeatedly superimposed on the information signal recorded on first tracks each of which is located at one of adjacent four tracks, a second pilot signal, which has a different frequency component from the first pilot signal component, being repeatedly superimposed on the information signal recorded on second tracks each of which is located at another one of adjacent four tracks, no pilot signal component being superimposed on the information signal recorded on every other track located between the first tracks and the second tracks, comprising:

(a) first and second heads for alternately tracing the recording medium at intervals of a predetermined period; and (b) tracking control means for forming a tracking error signal by comparing the first and second pilot signal components concurrently contained in a signal reproduced by said first head and executing tracking control of said first and second heads, said tracking control means including sampling means for sampling the tracking error signal immediately after a start of each period during which said first head reproduces the information signal and immediately before an end of the each period during which said first head reproduces the information signal, wherein said sampling means does not execute sampling the tracking error signal when said second head reproduces the information signal.

18. An apparatus according to claim 17, further comprising adjusting means for extracting at least one of the first and second pilot signal components during a period in which said second head reproduces the information signal, and adjusting said tracking control means.

19. An information signal reproducing apparatus for reproducing an information signal from a recording medium on which a multiplicity of parallel tracks are formed, a first pilot signal component being repeatedly superimposed on the information signal recorded on first tracks each of which is located at one of adjacent four tracks, a second pilot signal, which has a different frequency component from the first pilot signal component, being repeatedly superimposed on the information signal recorded on second tracks each of which is located at another one of adjacent four tracks, no pilot signal component being superimposed on the information signal recorded on third tracks located between the first tracks and the second tracks, comprising:

(a) head means for reproducing a signal by periodically tracing the recording medium at a predetermined period; and (b) forming means for forming a tracking error signal by comparing the first and second pilot signal components concurrently contained in a signal reproduced during a period in which said head means mainly reproduces a signal recorded on the third tracks, said forming means including sampling means for sampling the tracking error signal immediately after a start of each period during which said head means mainly reproduces a signal recorded on each of the third tracks and immediately before an end of the each period during which said head means mainly reproduces the signal recorded on each of the third tracks, wherein said sampling means executes only in the period in which said head means mainly reproduces the signal recorded on the third tracks.

20. An apparatus according to claim 19, further comprising modifying means for modifying the tracking error signal by using a signal reproduced in the predetermined period in which said head means reproduces a signal recorded on the first tracks.

21. An information signal reproducing apparatus for reproducing an information signal from a recording medium on which a multiplicity of parallel tracks are formed, a first pilot signal component being repeatedly superimposed on the information signal recorded on first tracks each of which is located at one of adjacent four tracks, a second pilot signal, which has a different frequency component from the first pilot signal component, being repeatedly superimposed on the information signal recorded on second tracks each of which is located at another one of adjacent four tracks, no pilot signal component being superimposed on the information signal recorded on third tracks located between the first tracks and the second tracks, comprising:

(a) first and second heads for alternately tracing the recording medium at intervals of a predetermined period;

(b) forming means for forming a tracking error signal by comparing the first and second pilot signal components concurrently contained in a signal reproduced by said first head;

(c) sampling means capable of sampling the tracking error signal a plurality of times in each period during which said first head reproduces the information signal, said sampling means sampling the tracking error signal at least at a timing that the first head starts reproducing a signal recorded on each of the third tracks; and (d) tracking control means for executing tracking control of said first and second heads in accordance with the tracking error signal sampled by said sampling means.

22. An apparatus according to claim 21, wherein said tracking means executes the tracking control by using all of the plurality of sampled tracking error signals sampled in the period during which said first head reproduces the information signal.

23. An information signal reproducing apparatus for reproducing an affirmed signal from a recording medium on which a multiplicity of parallel tracks are formed, a first pilot signal component being repeatedly superimposed on the information signal recorded on first tracks each of which is located at one of adjacent four tracks, a second pilot signal, which has a different frequency component from the first pilot signal component, being repeatedly superimposed on the information signal recorded on second tracks each of which is located at another one of adjacent four tracks, no pilot signal component being superimposed on the information signal recorded on third tracks located between the first tracks and the second tracks, comprising:

(a) head means for reproducing a signal by periodically tracing the recording medium at a predetermined period; and (b) forming means for forming a tracking error signal by comparing the first and second pilot signal components concurrently contained in a signal reproduced during the predetermined period in which said head means reproduces a signal recorded on the third tracks;

(c) sampling means capable of sampling the tracking error signal a plurality of times in each period during which said head means traces the third tracks, said sampling means sampling the tracking error signal at least at a timing that said head means starts tracing each of the third tracks; and (d) tracking control means for executing tracking control of said head means in accordance with the tracking error signal sampled by said sampling means.

24. An apparatus according to claim 23, wherein said tracking means executes the tracking control by using all of the plurality of sampled tracking error signals sampled in the period during which said head means traces the second tracks.

* * * * *